(12) United States Patent
Siegel et al.

(10) Patent No.: US 7,254,639 B1
(45) Date of Patent: Aug. 7, 2007

(54) METHODS AND APPARATUS FOR DIRECTING PACKETS AMONG A GROUP OF PROCESSORS

(75) Inventors: Kenneth P. Siegel, Nashua, NH (US); John J. Krawczyk, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 755 days.

(21) Appl. No.: 10/151,132

(22) Filed: May 20, 2002

(51) Int. Cl.
*G06F 15/173* (2006.01)

(52) U.S. Cl. .................. 709/238; 370/395.31; 370/389

(58) Field of Classification Search ................ 709/226, 709/245, 238; 370/395.32, 392, 389, 395.31; 718/105
See application file for complete search history.

(56) References Cited

U.S. PATENT DOCUMENTS

| | | | | |
|---|---|---|---|---|
| 5,864,679 | A | 1/1999 | Kanai et al. | 395/200.68 |
| 6,032,253 | A | 2/2000 | Cashman et al. | 712/300 |
| 6,058,267 | A | 5/2000 | Kanai et al. | 395/800.28 |
| 6,230,200 | B1 | 5/2001 | Forecast et al. | 709/226 |
| 6,351,775 | B1 | 2/2002 | Yu | 709/238 |
| 6,738,378 | B2 * | 5/2004 | Tuck et al. | 370/392 |
| 6,751,646 | B1 * | 6/2004 | Chow et al. | 718/105 |
| 6,862,623 | B1 * | 3/2005 | Odhner et al. | 709/226 |
| 6,871,347 | B2 * | 3/2005 | Hay | 718/105 |
| 6,883,028 | B1 * | 4/2005 | Johnson et al. | 709/226 |
| 6,904,040 | B2 * | 6/2005 | Salapura et al. | 370/395.32 |
| 7,002,958 | B1 * | 2/2006 | Basturk et al. | 370/392 |
| 2002/0191600 | A1 * | 12/2002 | Shah et al. | 370/389 |
| 2003/0126291 | A1 * | 7/2003 | Wang et al. | 709/245 |

\* cited by examiner

*Primary Examiner*—Jungwon Chang
(74) *Attorney, Agent, or Firm*—Chapin IP Law, LLC; Barry W. Chapin, Esq.

(57) ABSTRACT

The invention is directed to techniques for allocating packets received by the flow control processor located on the input/output (I/O) communications interface of the data communications device to a forwarding entity or session processor, chosen from a plurality of session processors, for further processing or routing. The session processors have the same ability to make decisions relating to the processing and routing of the packet as does the flow control processor and can have per second packet processing rates that are different from the flow control processor located on the I/O communications interface of the data communications device. To allocate the packets to the session processors for further processing, the flow control processor processes information located within the header component of the received packet. Based upon the results of this processing, the flow control processor selects a session processor from a plurality of session processors and transfers the packet to the selected session processor for further processing and routing of the packet. The flow control processor on the I/O communications interface, therefore, acts to load balance incoming packets among other session processors, thereby alleviating potential congestion on the port caused by the reception of multiple packets from multiple clients and reducing potential degradation of performance of the data communications device.

To allocate the packets to the session processors for further processing, the flow control processor processes information located within the header component of the received packet. Based upon the results of this processing, the flow control processor selects a session processor from a plurality of session processors and transfers the packet to the selected session processor for further processing and routing of the packet. The flow control processor on the I/O communications interface, therefore, acts to load balance incoming packets among other session processors, thereby alleviating potential congestion on the port caused by the reception of multiple packets from multiple clients and reducing potential degradation of performance of the data communications device.

23 Claims, 9 Drawing Sheets

METHODS AND APPARATUS FOR DIRECTING PACKETS AMONG A GROUP OF PROCESSORS

BACKGROUND OF THE INVENTION

Computer networks are used to facilitate the exchange of information among computers connected to the network. Such computer networks include computer systems, or clients, that request information from a source and computer systems, or servers, which transmit information to the requesting client.

In one conventional system, a data communications device is placed in the network between the client computers and server computers to route a flow of packets, such as packets containing content requests, from the clients to the respective server computers. The data communications device distributes incoming client requests for data among the servers located within a group of servers or server farm. In this distribution process, known as load balancing, the data communications device prevents a single server within the server bank from becoming overloaded with requests for content by multiple clients.

Conventional data communications devices that couple to a network, such as the Internet, have one or more interfaces that receive a large percentage of the inbound packets containing content requests. Typically, for each packet, the data communications device performs an analysis of the destination, source, and/or content of the content request using a packet processing entity, such as a high-speed packet-forwarding device containing a processor located on the inbound input/output (I/O) communication interface in the data communications device. After performing the analysis, this processor subsequently routes the packets of the content request to an appropriate server for the duration of a data communication session between the client and selected server. The processing power required to quickly process and route packets to servers is relatively high.

SUMMARY OF THE INVENTION

While conventional data communications devices use a processor on the inbound I/O communication interface of a data communications device to process and route inbound packets to a destination, the use of such a processor includes several drawbacks. For example, in the case where multiple packets are simultaneously delivered to the processor from multiple clients or sources, if the memory or processing speed of the processor in the I/O communications interface is less than that required to efficiently process the packets, the performance of the processor can degrade such that the speed or rate at which the packets are processed and routed by the communications device decreases.

One solution to this deficiency is to utilize a relatively faster processor or a processor with a relatively greater amount of memory on the I/O communications interface of the data communications device. However, increasing the performance characteristics of the processor also increases the costs of the processor. Data communications devices using such processors with an increased speed or memory, therefore can have an increased cost.

In contrast to the conventional packet processing approach, the present invention is directed to techniques for allocating packets, received by a processor (e.g., a flow control processor) located on the I/O communications interface of the data communications device, to a forwarding entity, or session processor, chosen from a plurality of session processors, for further processing or routing. Each session processor has an ability to make decisions relating to processing and routing of the packet relative to, and can have per second packet processing rates that are different from, the flow control processor located on the I/O communications interface of the data communications device. To allocate the packets to the session processors for further processing, the flow control processor processes information located within the header component of the received packet. The processor can compare processed header information to a ranking or index of available session processors, ranked for example based on performance characteristics. Based upon the results of this processing, the flow control processor selects a session processor from a plurality of session processors and transfers the packet to the selected session processor for further processing and routing of the packet. The flow control processor, therefore, acts to load balance incoming packets among other session processors which then route the packets, thereby alleviating potential congestion on the inbound port caused by the reception of multiple packets from multiple clients and reducing potential degradation of performance by the data communications device.

One embodiment of the invention, in a data communications device, relates to a method for directing a packet to a session processor of the plurality of session processors available for processing (e.g., routing) packets. The method includes the steps of receiving a packet having a header component and generating an index value based upon at least a portion of the header component. The index value corresponds to a session processor for the packet. The method selects the session processor to process the packet from the plurality of session processors based upon the index value. As an example, the method can compare the index value or a portion of the index value (e.g., lower bits) to a table of possible index values that correspond to the available session processors in order to chose one session processor to process that packet. Allocation of packets to selected session processors in this manner reduces or prevents congestion of the flow control processor located on the port of a communications device.

In one embodiment, a data communications device repeats the steps of receiving, generating, and selecting for a plurality of incoming packets. This process load balances incoming packet streams among the plurality of session processors that can then route otherwise direct the packets and further prevents congestion of the flow control processor.

In one embodiment, when the data communications device receives the packet, the communications device performs the step of obtaining at least a portion of the header component from the packet. For example, the data communications device can retrieve transport layer information from the header component, such as a TCP source port value and a destination TCP port value. The data communications device then uses this information to generate the index value. As an example, the method generates an index value in one embodiment by exclusive or'ing (X-OR) together source and destination TCP port number values to produce the index value.

After generating the index value, the data communications device uses the index value to select a session processor to process the packet. For example, the step of selecting in one embodiment includes comparing the index value with index value entries in a lookup table in which each index value entry corresponds to a session processor. The method then selects a session processor for the packet. The session processor corresponds to the index value entry in the lookup table based on the comparison. The number of entries in the table depends, in one embodiment, upon performance characteristics of the session processors. The performance characteristics of session processors can include, for example, the processing capability or power of a session processor's central processing units (CPU), the amount of memory accessible by the session processor, or the amount of loading or the number of packets handled by the session processor.

In another embodiment, the data communications device uses the index value to select a routing vector for the packet where the routing vector is used to direct the packet to a corresponding session processor.

In another embodiment, the method includes the step of initializing a lookup table having index value entries and corresponding session processor entries. The process of initializing allows the data communications device to either access or create a lookup table that routes or otherwise provides a routing mechanism to compare session processors against each other. For example, the data communications device creates session processor entries in the lookup table for each of the plurality of session processors where the number of entries within the table is based upon at least one performance characteristic for each session processor within the plurality of session processors. This step of creating can include the step of deriving at least one performance characteristic for each session processor. As stated above, the performance characteristic of a session processor can include, for example, the processing capability or power of the session processor's central processing units (CPU), the amount of memory accessible by the session processor, or the amount of loading or the number of packets handled by the session processor. As an example, a first or high performance session processor can have a correspondingly high number of entries (i.e., index values) in the look-up table as compared to a lesser performing session processor.

In another embodiment of the invention, a data communications device has at least one communications interface having a flow distribution processor, at least two session processors coupled to the flow distribution processor, a memory coupled to the flow distribution processor, and an interconnection mechanism coupling the flow distribution processor, the at least one communications interface, the memory, and the at least two session processors. The flow distribution processor in the data communications device is configured to receive a packet having a header component and generate an index value based upon at least a portion of the header component. The index value corresponds to a session processor for the packet. The flow distribution processor selects the session processor to process the packet from the plurality of session processors based upon the index value.

Other embodiments of the invention that are disclosed herein include software programs to perform the operations summarized above and disclosed in detail below. More particularly, a computer program product is disclosed which has a computer-readable medium including computer program logic encoded thereon to provide the methods for directing packets to session processors according to this invention and its associated operations. The computer program logic, when executed on at least one processor within a computing system, causes the processor to perform the operations (e.g., the method embodiments above, and described in detail later) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention.

It is to be understood that the system of the invention can be embodied strictly as a software program, as software and hardware, or as hardware or circuitry alone. Is also to be understood that the method for routing a packet of this invention typically performs (e.g., executes, runs, or is otherwise operated) on a data communications device coupled to a network. In alternative arrangements however, the data communications device of this invention can reside on a computer system or other device located elsewhere on the network.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The present invention is directed to techniques for directing packets received by a flow control processor located within an input/output (I/O) communication interface of a data communications device. The flow control processor can direct packets to a forwarding entity or session processor, chosen from a plurality of session processors, for further processing or routing. The session processors have the same ability to make decisions relating to the processing and routing of the packet and can have per second packet processing rates that are different from the flow control processor that received the packet (i.e., the processor located on the I/O communication interface of the data communications device at which the packet arrived). To allocate the packets to the session processors for further processing, the flow control processor processes information located within the header component of the received packet. The processor can compare processed header information to a ranking or index of available session processors, ranked for example based on performance characteristics. Based upon the results of this processing, the flow control processor selects a session processor from a plurality of session processors to further process and route the packet.

Figure 1:
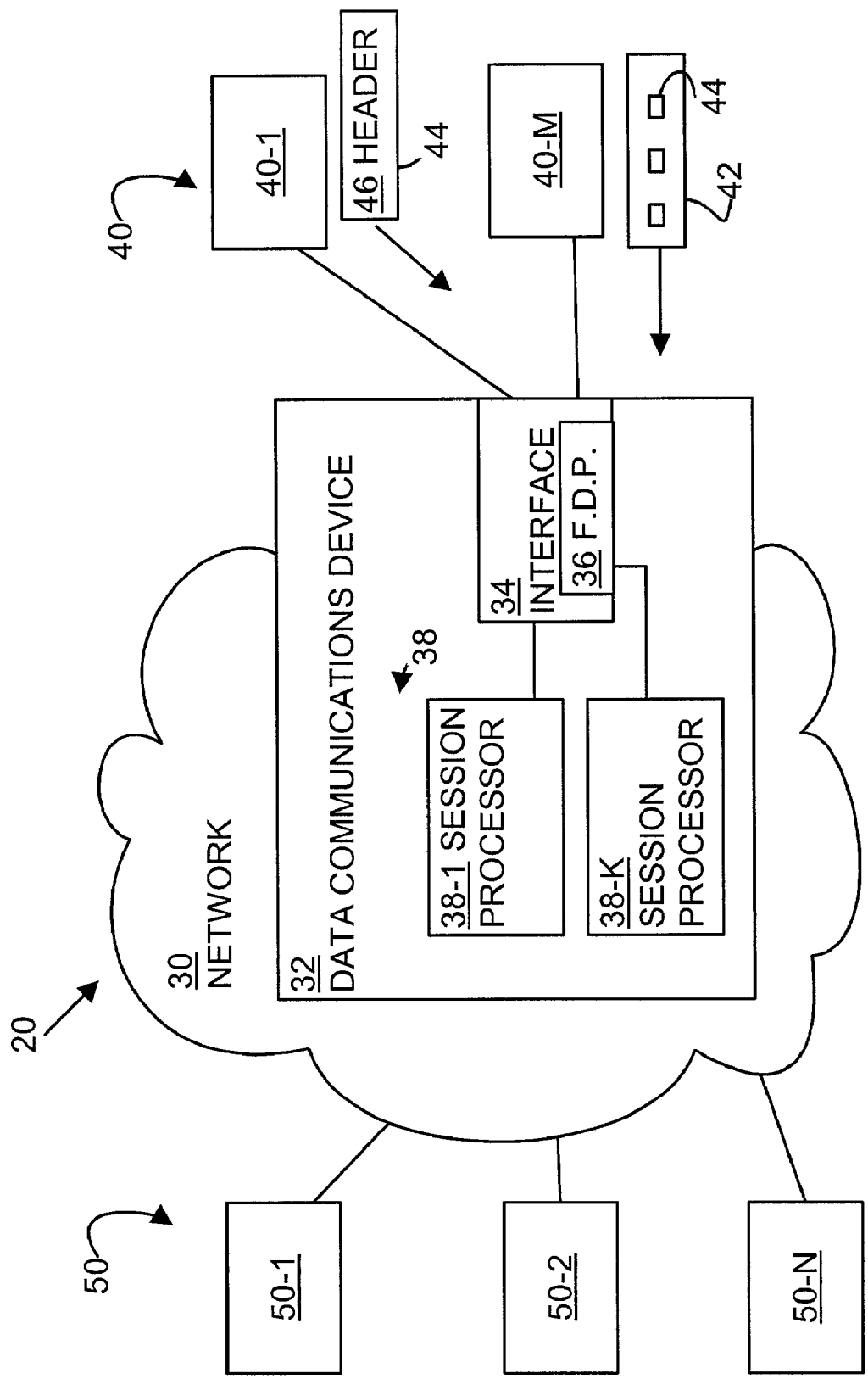
FIG. 1 illustrates a block diagram of a data communications system configured according to one embodiment of the invention.

FIG. 1 illustrates an embodiment of a data communications system, given generally as 20. The data communications system 20 includes client computers 40, a data communications device 32, and server computers 50. The client computers 40 are in communication with the data communications device 32. The client computers, as illustrated, include computers 40-1 and 40-M. The server computers 50 are connected to the data communications device 32 by a network 30 such as the Internet, a local area network or another type of network. The server computers 50 include computers 50-1, 50-2 and 50-N.

The data communications device 32 acts as a point-of presence in the data communications system 20. The data communications device 32 can be, for example, a router, switch, proxy server, network bridge, data repeater, protocol converter, or other type of device that can transmit data between other devices (e.g., clients 40 and servers 70) in the system 20. In this example, the servers 50-1, 50-2, and 50-N are in communication with the data communication device 32 that operates as a load balancer for the servers 50-1, 50-2, and 50-N when routing client requests 44 to the servers 50.

The data communications device 32 has a communications interface 34 having a flow distribution processor 36. The communications interface 34 is connected to a plurality of session processors 38. As shown, the session processors 38 include session processor 38-1 through session processor 38-K.

During operation of the data communications system 20, the clients 40 transmit one or more packets 44 to the data communications device 32. For example, client 40-M transmits packets 44 as part of a data stream 42. Alternately, as shown, client 40-1 transmits individual packets 44 to the data communications device 32. Each packet contains a header component 46, or header information, that includes in this example, a source (e.g., client) Internet protocol (IP) address, a source transmission control protocol (TCP) port number, a destination (e.g., server) IP address, and a destination TCP port number.

Generally, in operation, the communication interface 34 of the data communications device 32 receives the packets 44 from the client computers 40. The flow distribution processor 36 load balances or allocates the incoming packets 44 among the session processors 38 in communication with the communication interface 34, based upon at least a portion of the header component 46 as explained herein. The session processors 38 further process and route or otherwise direct the packets 44 to the servers 50, thereby easing the load on the flow distribution processor 36 caused by reception of multiple packets 44 within a relatively narrow time period. In other words, the flow distribution processor 36 can offload packet processing tasks, such as making a routing decision for a packet, to one of the session processors 38 according to the techniques explained herein.

The flow distribution processor 36 can allocate or direct the packets 44 among the session processors 38 based upon one or more performance characteristics of each of the session processors 38. For example, a performance characteristic of the session processors 38 can include the processor speed or processor memory of the session processor 38. The relatively greater the processor speed or memory of a session processor 38, the greater the probability that the flow distribution processor 36 allocates a packet to the session processor 38. During operation, the flow distribution processor 36, therefore, allocates more packets to a first session processor 38 having a relatively faster processor speed or a relatively larger memory as compared to a second session processor which can be slower and thus, receives less packets.

As stated, the flow distribution processor 36 allocates inbound packets 44 to session processors 38 for further processing in order to ease the load or burden on the communications interface 34 and flow distribution processor 36 caused by the transmission of multiple packets 44 by several clients 40 within a relatively narrow time frame.

Figure 2:
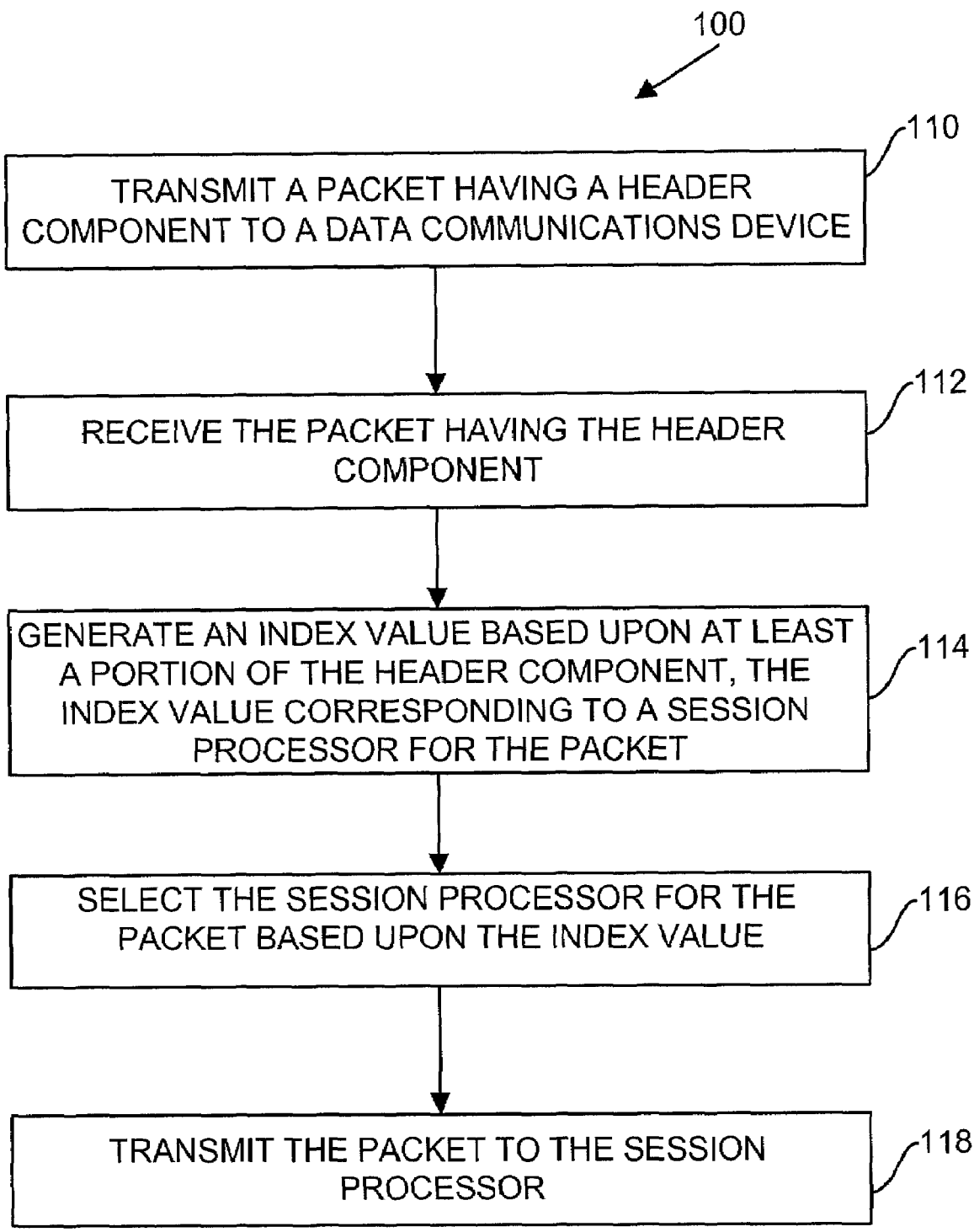
FIG. 2 illustrates a flowchart of a procedure performed by the data communications system of FIG. 1 configured according to one embodiment of the invention.

FIG. 2 illustrates a procedure 100 for allocating a packet 44 to a session processor 38 of a plurality of session processors 38-1 through 38-K by a data communications device 32. In one embodiment, the flow distribution processor 36 executes the procedure 100.

In step 110, a client computer 40 transmits a packet 44 to the data communications device 32. As described above, the packet 44 includes header information 46 including a source IP address, a source TCP port number, a destination IP address, and a destination TCP port number. The packet also contains data 48 in the form of an information request. Generally, the data communications device 32 utilizes the header information 46 to transmit the packet 44 from the client 40 to the proper server 50 or destination and to direct responses to the request from the server 50 back to the requesting client 40 or source.

In step 112, the flow distribution processor 36 in the data communications device 32 receives the packet 44 having the header component 46. The flow distribution processor 36 utilizes the information located within the header component 46 to forward the packet 44 to a particular session processor 38. In one embodiment, after the flow distribution processor 36 receives the packet 44, the processor 36 retrieves, extracts, copies, reads or otherwise obtains access to at least a portion of the header component 46 from the packet 44. By obtaining just a portion of the header component 46 from the packet 44, the flow distribution processor 36 can readily utilize or manipulate specific information contained within the retrieved portion. For example, in one embodiment, the processor 36 obtains transport layer information from the header component 46 where the transport layer information includes a source port number 52 and a destination port number 54. The flow distribution processor 36 then utilizes the transport layer information to select, chose, or otherwise allocate a session processor 38 for the packet 44, as will be explained.

Next, in step 114, the flow distribution processor 36 generates an index value 60 based upon at least a portion of the header component 46 of the packet 44. The generated index value 60 corresponds to a session processor 38 that will be used to further process and route the packet 44.

In one embodiment, in order to generate the index value, the flow distribution processor 36 combines a least a portion of the header component 46 using a mathematical function, such as a masking function. For example, transport layer information from the header component 46, such as a bit pattern of source and destination TCP port numbers can be combined with a masking function, such as exclusive OR (XOR), to generate the index value 60.

In step 116, the flow distribution processor 36 selects a session processor 38 for the packet 44, based upon the generated index value 60. In one embodiment, the flow distribution processor 36 accesses a lookup table 132 (e.g., see FIG. 6) that includes index value entries 66 and corresponding session processors entries 68. The flow distribution processor 36 compares the generated index value 60 with the index value entries 66 in the table 132. When the processor 36 detects a match between the generated index value 60 and the index value entries 66 in the table 132, the processor 36 then selects the session processor 38, corresponding to the matched index value entry, for the packet 44. In another embodiment, the flow distribution processor 36 selects a routing vector for the packet 44 based upon the index value 60. The routing vector includes instructions that direct the packet 44 to a corresponding session processor 38.

In step 118, the flow distribution processor 36 transmits the packet 44 to the selected session processor 38 for further processing. For example, the selected session processor 38 performs routing of the packet 44 to an appropriate sever computer 50. The session processors 38, in one embodiment, are located within the data communications device 32. Alternately, the session processors 38 are located external to the data communications device 32, between the data communications device 32 and the servers 50.

In another embodiment, the process 100 of receiving a packet (step 112), generating an index value 60 (step 114) based on at least a portion of a header 46, and selecting a session processor 38 (step 116) is repeated by the flow distribution processor 36 for multiple packets received by the data communications device 32. Repeating the process causes the flow distributor processor 36 to load balance a stream of packets 44 among the session processors 38 in communication with the flow distributor process 36. This load balancing decision is based upon the capabilities of the session processors 38. For example, certain session processors 38 can receive a greater number of packets 44 from the flow distribution processor 36 than do other session processors 38, based upon the performance characteristics of the session processors 38. Therefore, while the flow distribution processor 36 load balances the packets 44 among the session processors 38, the distribution of packets is weighted toward the session processors 38 that have a greater capability (i.e., faster, more memory) over the session processors 38 with a relatively lesser capacity.

As discussed, the data communications device 32 performs the process of allocating packets to a session processor 38 chosen from a plurality of session processors 38.

Figure 3:
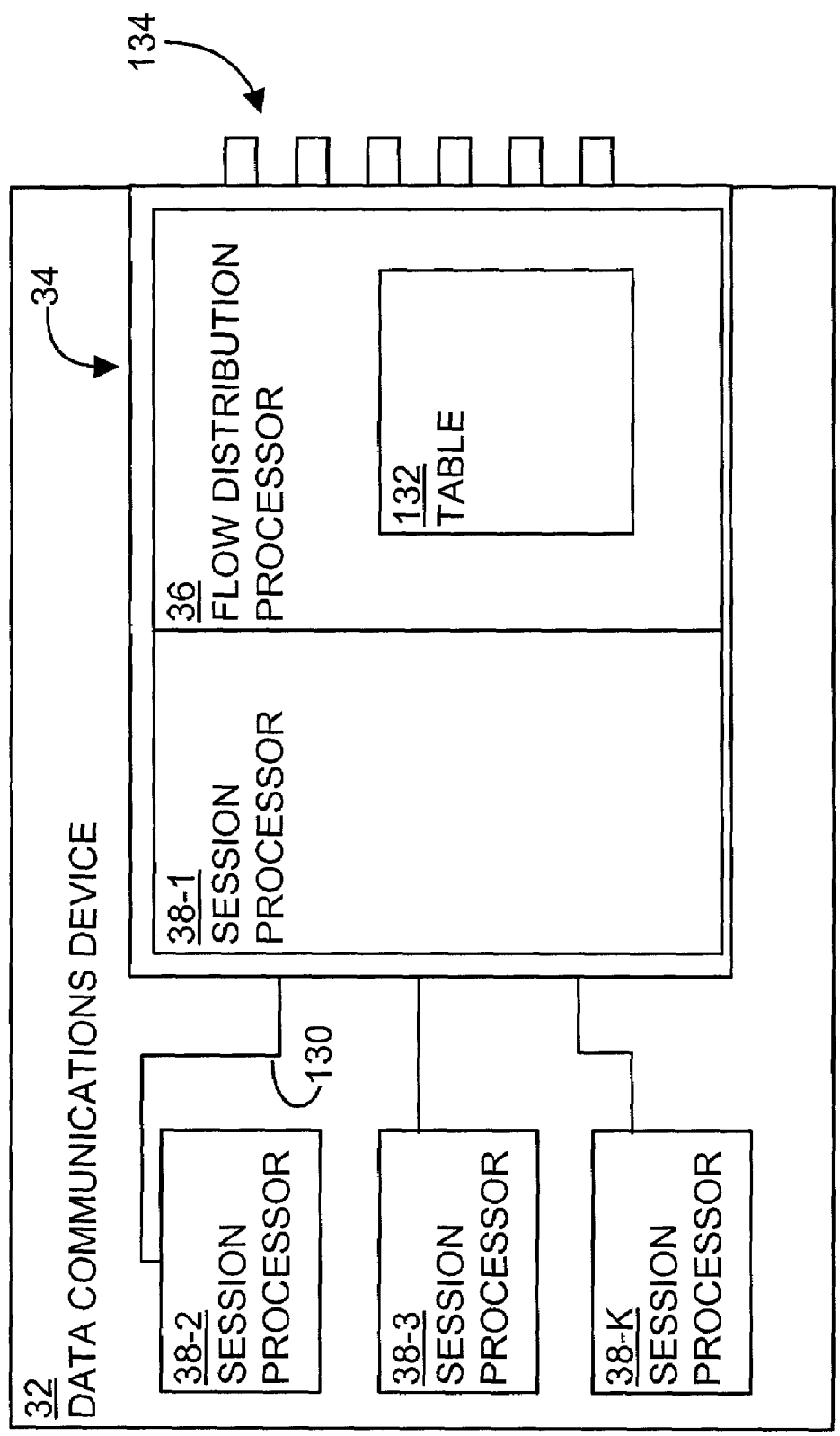
FIG. 3 shows a block diagram of a data communications device suitable for use in the system of FIG. 1 configured according to one embodiment of the invention.

FIG. 3 illustrates a block diagram showing detail of an example embodiment of a data communications device 32.

In this example, the data communications device 32 has a plurality of input devices 134, such as ports. The ports 134 provide connection points between the communications interface 34 of the data communications device 32 and the client computers 40. The communications interface 34, as illustrated, includes the flow distribution processor 36 and a session processor 38-1. The flow distribution processor 36 receives packets 44 from the client computers 40 by way of the input devices 134. The session processor 38-1 processes and routes the packets 44 received by the data communications device 32. As shown in this embodiment, the session processor 38-1 is a local session processor 38, integrally formed with the flow distribution processor 36 within the communications interface 34. Conventionally, each flow distribution processor 36 in a data communications device 32 is integrally associated with one session processor 38-1. The communications interface 34 is also in communication with, or connected to, session processors 38-2, 38-3, and 38-K by an interconnection mechanism 130. These session processors 38-2, 38-3, and 38-K provide processing and routing for multiple packets 44 received by the data communications device 32.

The data communications device 32 includes a flow distribution table or lookup table 132, used by the flow distribution processor 36, to detect the proper session processor 38 to receive a packet 44. As illustrated, the flow distribution processor 36 stores the table 132. For example, in one embodiment, a memory component accessible by the flow distribution processor 36 stores the table 132.

The table 132 contains entries that map index values 60 generated by the flow distribution processor 32 to particular session processors 38. An initialization procedure populates the table 132 with session processor entries 68 to reflect the relative processing capabilities of each eligible session processor 38 in communication with the flow distribution processor 36. Session processors 38 having relatively powerful processing capabilities populate or exist in the table more than session processors 38 having less powerful processing capabilities. For example, session processors 38 with relatively powerful central processing units, relatively large amounts of memory, or relatively less loading than other session processors 38 have a greater number of entries within the table 132 as compared to session processors 38 having relatively weak processing units, relatively low levels of memory, or greater loading levels. Because the network information within the header portion 46 of a packet 44 is relatively random across a large number of clients 40, the table 132 is used to both distribute the load (e.g., packets 44) to more than one session processor 38 and to indicate the capabilities of the session processors 38 that can receive the packets 44.

Once the selected session processor 38 routes a packet to a respective server 50, the session processor 38 maintains the session between the client 40 and the server 50. In this case, the flow distribution processor 36 continually allocates or directs the packets 44 from one client 40 to a single session processor 38. Because the index value 60 generated by the flow distribution processor 36 is invariant across packets 44 that emanate from the same client transport layer stream to server transport layer stream (e.g., that are associated with a single TCP connection), the context for handling or routing these packets 44 need only be contained at the session processor 38 selected by the flow distribution processor 36 from the table 132 at the inbound communications interface 34.

The lookup table 132, in one embodiment, includes index value entries 66 and corresponding session processor entries 68. When the flow distribution processor 36 receives a packet 44 from a client computer 40, the flow distribution processor 36 generates an index value 60. The processor 36 then compares the generated index value 60 to the index value entries 66 in the lookup table 132. Based on this comparison, the flow distribution processor 36 selects the corresponding session processor 38 to receive the packet 44.

FIGS. 4 through 7 illustrate an embodiment of a flow distribution processor 36 allocating or directing a packet 44 to a session processor 38. These figures show an example of how the flow distribution processor 36 uses the header information 46 from a packet 44 to generate an index value 60 and how that value 60 is, in turn, used to choose a session processor 38 for further processing of the packet 44.

Figure 4:
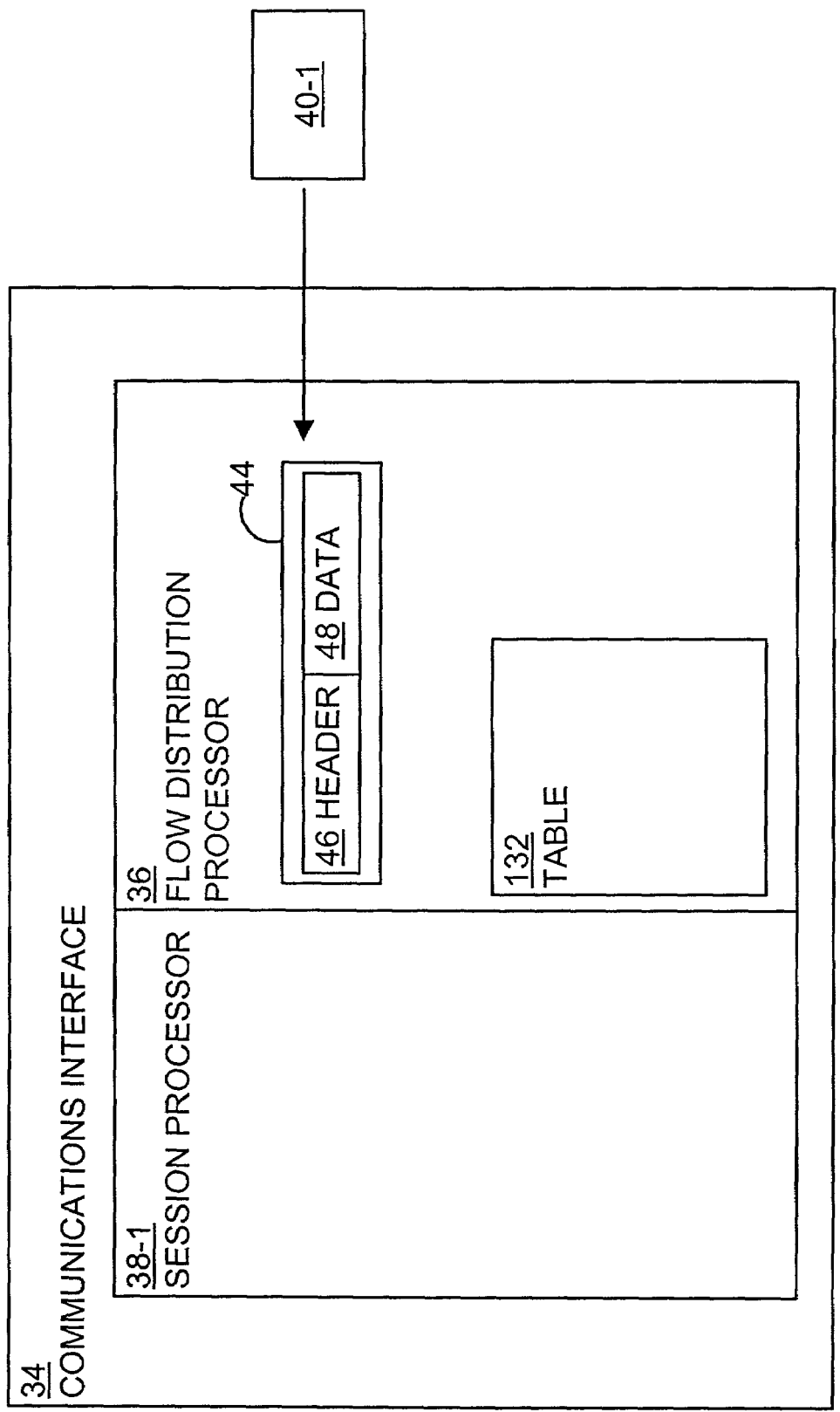
FIG. 4 shows a block diagram of a communications interface receiving a packet configured according to one embodiment of the invention.

In FIG. 4, a client computer 40-1 transmits a packet 44 to the communications interface 34 of a data communications device 32. The flow distribution processor 36 of the data communications interface 34, in turn, receives the packet 44. As illustrated, the packet 44 includes a header portion 46 and a data portion 48.

Figure 5:
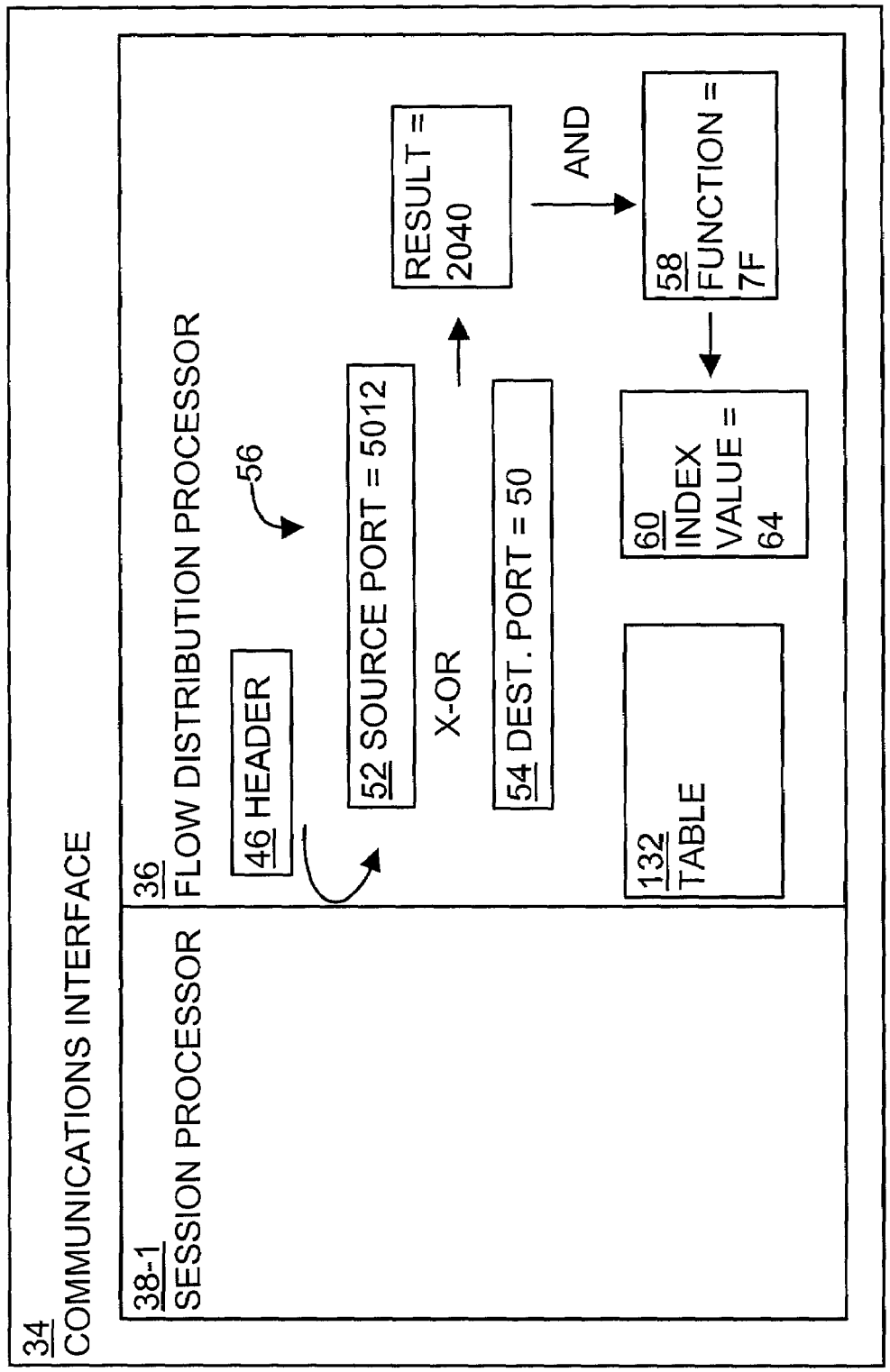
FIG. 5 illustrates a block diagram of the communications interface of FIG. 4 processing information from the packet configured according to one embodiment of the invention.

FIG. 5 illustrates how the flow distribution processor 36 obtains at least a portion of the header component 46 from the packet 44. The flow distribution processor 36 obtains transport layer information 56 in the form of source port information or a source port value 52 and destination information or a destination port value 54 from the header 46. In this example, the source port value 52 is set at 5012 and the destination port value is set at 50. Client computers 40 typically randomly generate the source port values 52. Destination port values 54 are typically selected by the client 40 to represent a particular transmission protocol for a packet 44. For example, a destination port value of 80 indicates that the packet 44 is an HTTP packet.

The flow distribution processor 36 combines the obtained portion of the header 46 with a mathematical function 58 to generate an index value 60. As shown in FIG. 5, prior to combining the extracted portion of the header 46 with the function 58, the flow distribution processor 36 combines or hashes the extracted header components 56 to generate a single value or result. For example, the flow distribution processor 36 combines the source port value 52 and the destination port value 54 using an X-OR procedure. For ease of computation in this example, the values are provided as hexadecimal values. For example, the destination port value 54 of 5012 is equivalent to a value of 0x2010 in hexadecimal and the source port value 52 of 80 is equivalent to a value of 0x50 in hexadecimal. The flow distribution processor 36 combines the values of 0x2010 and 0x50 using the X-OR process and generates a resultant value of 0x2040 hexadecimal.

Next, the result of the X-OR procedure is combined or hashed with a mathematical function or masking function 58 using an AND procedure to generate the index value 60 of 0x7F. For example, assume the masking function 58 has a value of. In this example, using an AND procedure, the flow distribution processor 36 combines the masking function 58 with the result of the X-OR procedure. A combination of 0x2040 hexadecimal (e.g., result of the X-OR procedure) with 0x7F (e.g., masking function 58) using the AND procedure results in an index value 60 equal to 0x40 hexadecimal or 64 decimal. Therefore, in this example, to generate an index value, the flow distribution processor 36 executes the procedure:

((source port value) X-OR (destination port value)) AND (masking function).

Figure 6:
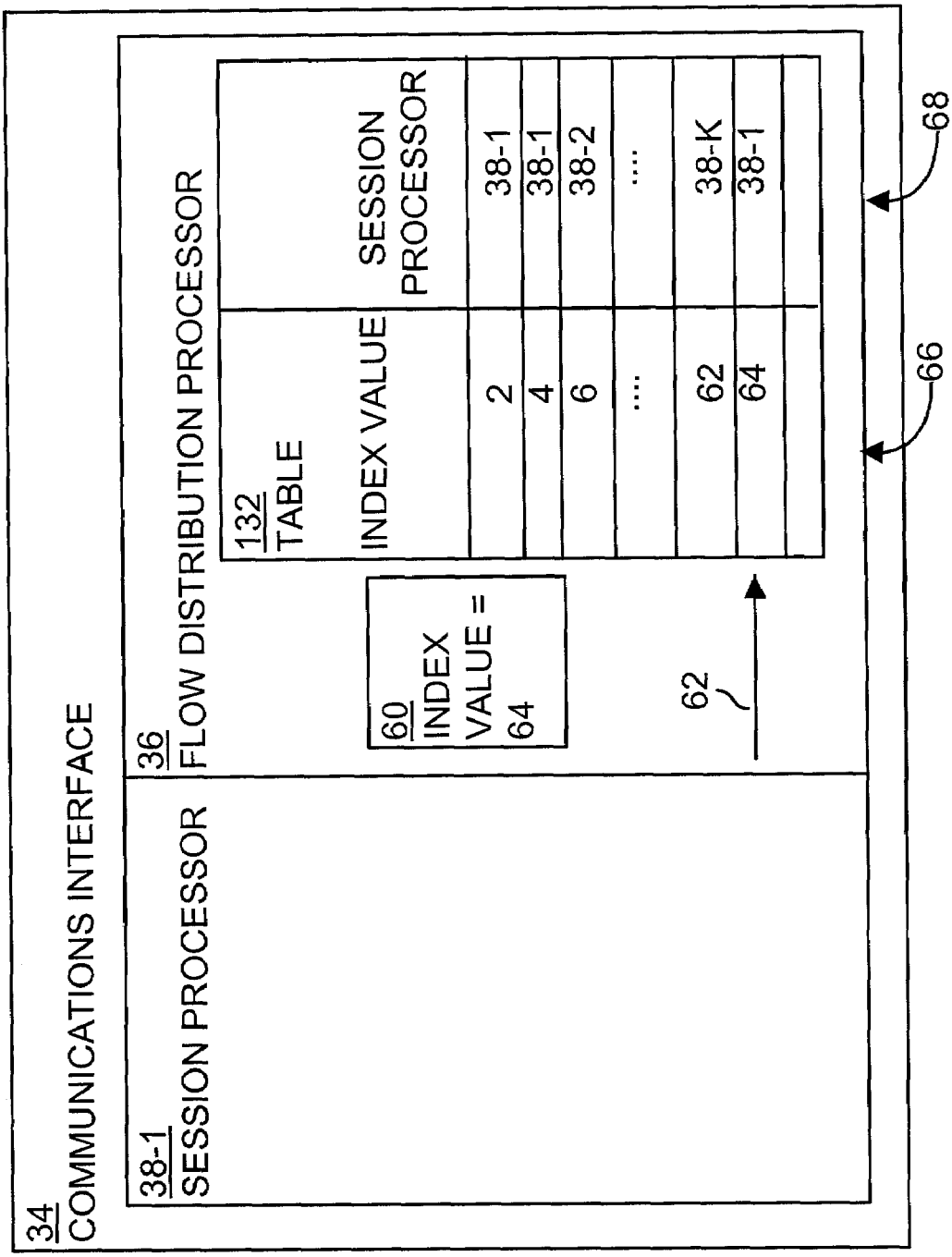
FIG. 6 illustrates a block diagram of the communications interface of FIG. 4 selecting a session processor for the packet configured according to one embodiment of the invention.

FIG. 6 illustrates the flow distribution processor 36 selecting, from table 132, a session processor 38 to process the packet 44 based upon the generated index value 64. The table 132 includes a plurality of index value entries 66 and a corresponding plurality of session processor entries 68. Each session processor 38 within a data communications system 20 can be included within the table 132 more than once. For example, a session processor 38 that has a high processing capability appears within the table 132 more often than a session processor 38 having a low processing capability. Because of this, the session processors 38 that appear in the table 138 more frequently than other session processors 38 and thus, corresponding to more possible index values have a higher probability of receiving packets 44 from the flow distribution processor 36.

As shown in this example, the index value 60 for the packet 44 is equal to 64 decimal. The flow distribution processor 36 compares this index value 60 with the index value entries in the look-up table 132. The flow distribution processor 36 then selects the session processor 38 for the packet 44 that corresponds to the index value entry 66 in the lookup table 132. As shown, for an index value of 64 decimal, the corresponding session processor 38 to process the packet 44 is session processor 38-1, as indicated by arrow 62.

FIG. 6 illustrates an example where the session processor 38-1 is formed integrally with the flow distribution processor 36 and the flow distribution processor selects the session processor 38-1 to further process and route the packet 44. In alternate embodiments, session processors 38, such as session processors 38-2, 38-3, and 38-K shown in FIG. 3, can be selected to route the packet 44. These processors 38 are connected to the flow distribution processor 36 but are not integrally formed with the processor 36.

Figure 7:
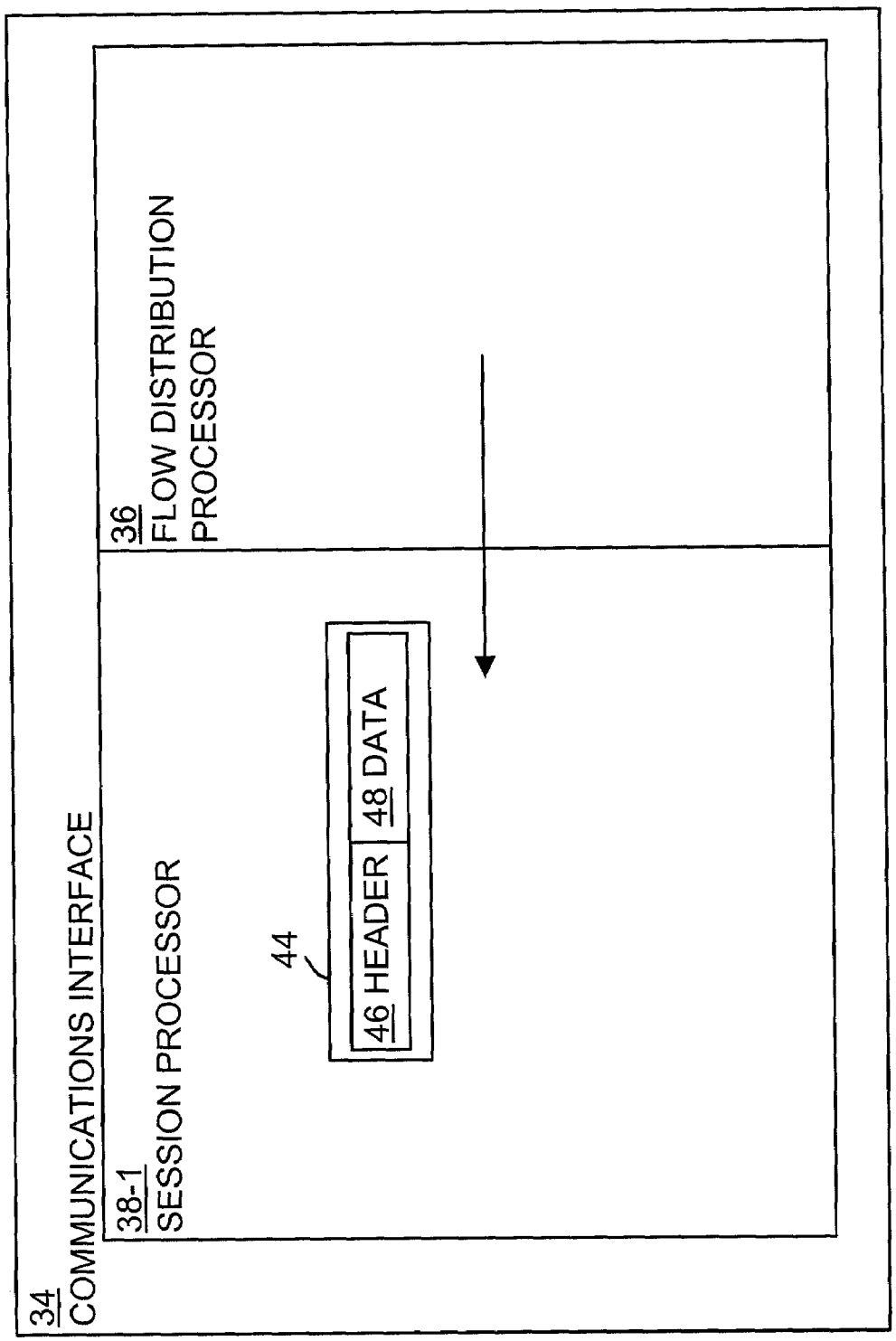
FIG. 7 shows a block diagram of the communications interface of FIG. 4 transmitting the packet to the selected processor configured according to one embodiment of the invention.

FIG. 7 illustrates the flow distribution processor 36 transferring the packet 44 to the session processor 38-1. The session processor 38-1 further processes and routes the packet 44 to an appropriate server 50 connected to the data communications device 32.

Prior to utilizing the table 132, described above, the data communications device 32, in one embodiment, undergoes a process to access the table 132.

Figure 8:
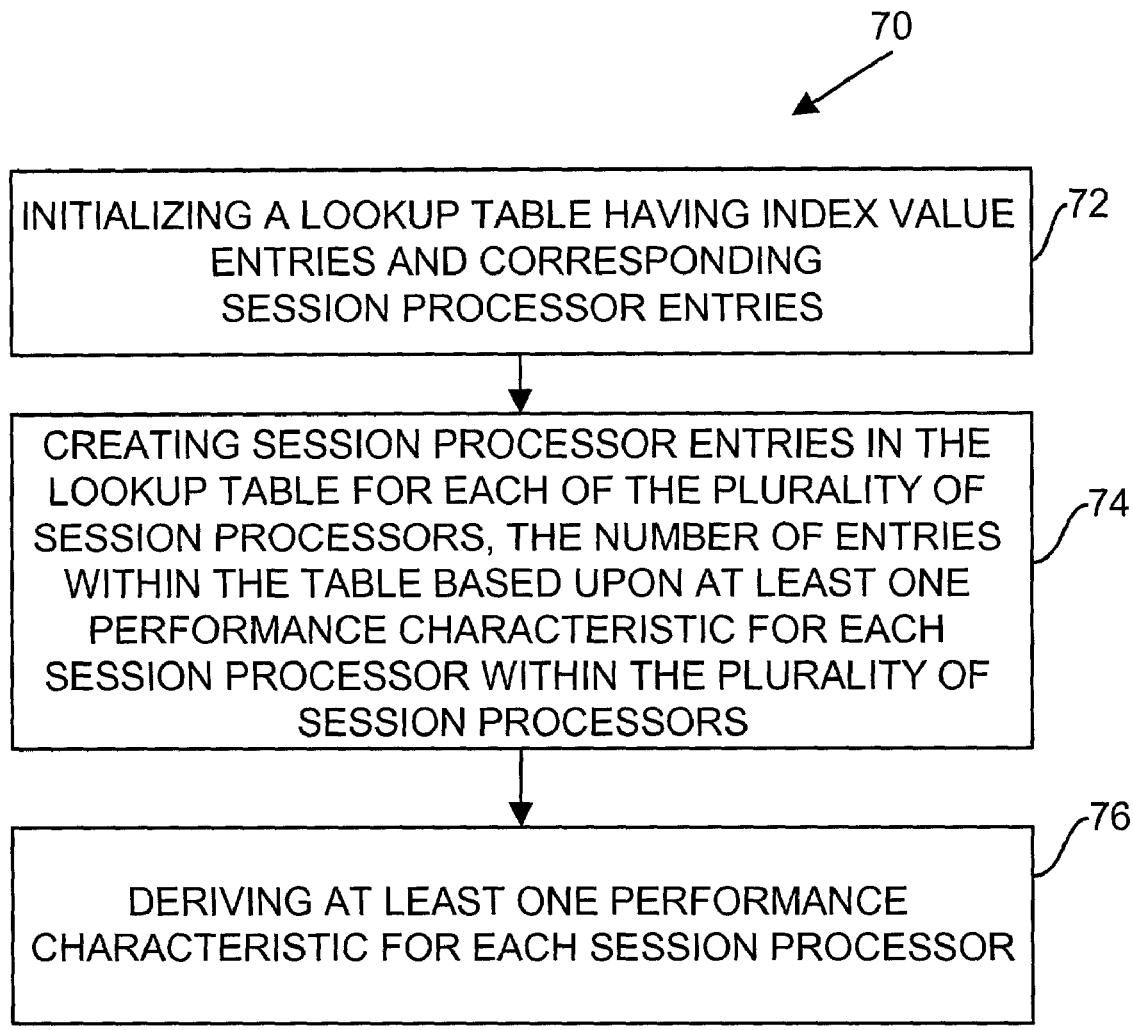
FIG. 8 shows a flowchart of a procedure performed by the communications interface of FIG. 4 configured according to one embodiment of the invention.
Figure 9:
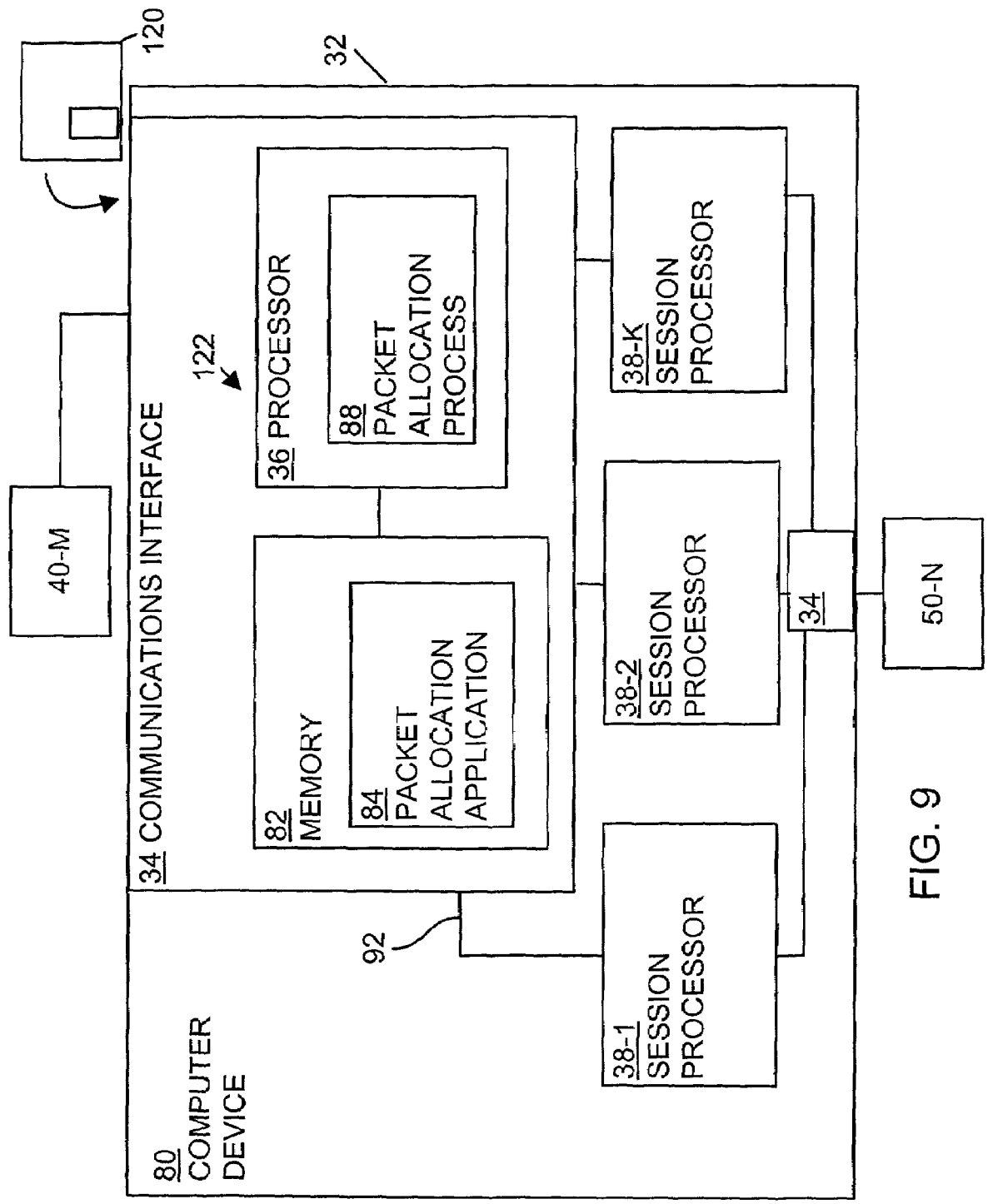
FIG. 9 illustrates an embodiment of a computer device, configured as a communications device configured according to one embodiment of the invention.

FIG. 8 illustrates the process 70 performed by the communications device 32 and in particular, by the flow distribution processor 36, to access the lookup table 132.

In step 72, the flow distribution processor 36 initializes the lookup table 132 where the table 132 has index value entries 66 and corresponding session processor entries 68. In this step, the processor 36 accesses a previously created table 132 from computer memory, such as RAM, or from disk memory, such as a floppy disk, for example. The processor utilizes this table 132 to direct packets 44 to session processors 38 for further processing. The processor 36, in an alternate embodiment, generates the table 132 prior to receiving packets 44 from a client 40.

In step 74, the flow control processor 36 creates session processor entries 68 in the lookup table 132 for each of the plurality of session processors 38 that are part of the data communications system 20. The number of session processor entries 68 within the table 132 is based upon at least one performance characteristic for each session processor within the plurality of session processors 38. For example, assume a data communications system 20 has session processors 38 with relatively powerful central processing units (CPU), relatively large amounts of memory, or relatively less loading compared to other session processors 38 within the data communications system 20. The flow control processor creates a greater number of session processor entries 68 within the table 132 for the processors 38 having the more powerful CPU's, the grater memory or lower loading levels, compared to session processors 38 having relatively less powerful processing units, less memory, or greater loading levels.

In step 76, the flow control processor 36 derives at least one performance characteristic for each session processor 38. For example, the flow control processor 36 derives or detects the amount of memory available for each of the session processors 38 within the system 20. Based on the results of the detection (i.e. the performance characteristic of the session processor), when the flow control processor 36 creates session processor entries 68 in the lookup table 132, the processor 36 creates an appropriate number of processor entries 68 within the table 132. The data communications system 20 includes a data communications device 32 that is, is one arrangement, a computer.

FIG. 8 illustrates a computer device 200, configured to run as a data communications device 32, that shows one embodiment of the invention. A computer program product 120 includes an application or logic instructions that are loaded into the computer device 80 to configure the device 80 to perform as a data communications device 32.

The computer device 80 includes an interconnection mechanism 92 such as a data bus or circuitry that interconnects a controller 122, that in one arrangement, includes a memory 82 and a processor 36, and one or more communications interfaces 34. The memory 82 can be of any type of volatile or non-volatile memory or storage system such as a computer memory (e.g., random access memory (RAM), read only memory (ROM), or another type of memory) disk memory, such as hard disk, floppy disk, optical disk, for example. The memory 82 is encoded with logic instructions and/or data that, in one embodiment of the computer device 80, form a packet allocation application 84 configured according to embodiments of the invention. In other words, the packet allocation application 84 represents software coding instructions and/or data that reside within the memory or storage 82, or within any computer readable medium accessible to the computer device 80.

The processor 36 represents any type of circuitry or processing device such as a central processing unit, controller, application specific integrated circuit, programmable gate array, or other circuitry that can access the packet allocation application 84 encoded within the memory 82 over the interconnection mechanism 92 in order to run, execute, interpret, operate, or otherwise perform the packet allocation application 84 logic instructions. In other words, in another embodiment of the computer device 80, the packet allocation process 88 represents one or more portions of the logic instructions of the packet allocation application 84 while being executed or otherwise performed on, by, or in the processor 36 within the computer device 80.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a data communications device having a plurality of session processors, each session processor capable of performing a routing decision for a packet, a method for directing the packet to a session processor of the plurality of session processors for processing, the method comprising the steps of:
   receiving a packet, the packet having a header component;
   generating an index value based upon at least a portion of the header component, the index value corresponding to a session processor for the packet;
   initializing a lookup table having index value entries and corresponding session processor entries, wherein initializing comprises creating session processor entries in the lookup table for each of the plurality of session processors, the number of session processor entries within the table based upon at least one performance characteristic for each session processor within the plurality of session processors; and
   selecting the session processor to process the packet from the plurality of session processors based upon the index value in the lookup table.

2. The method of claim 1 wherein the step of receiving further comprises obtaining at least a portion of the header component from the packet.

3. The method of claim 2 wherein the step of obtaining comprises retrieving transport layer information from the header component.

4. The method of claim 1 wherein the step of generating comprises combining a portion of the header component with a masking function to generate the index value, the index value corresponding to a session processor for the packet, combining including combining transport layer information from the header component with the masking function to generate the index value.

5. The method of claim 1 wherein the step of selecting comprises selecting a routing vector for the packet based upon the index value, the routing vector directing the packet to a corresponding session processor.

6. The method of claim 1 wherein the step of selecting comprises:
   comparing the index value with index value entries in a lookup table, each index value entry corresponding to a session processor; and
   selecting a session processor for the packet, the session processor corresponding to the index value entry in the lookup table based on the comparison.

7. The method of claim 1 wherein the step of creating further comprises deriving at least one performance characteristic for each session processor.

8. The method of claim 1 further comprising the step of repeating the steps of receiving, generating, and selecting for a plurality of packets to cause load balancing of the packets among the plurality of session processors.

9. The method of claim 1 further comprising:
   initializing a lookup table having index value entries and corresponding weighted session processor entries, wherein:
     receiving further comprises obtaining at least a portion of the header component from the packet; and
     generating the index value further comprises combining a portion of the header component with a masking function to generate the index value, the index value corresponding to a session processor for the packet, combining including combining transport layer information from the header component with the masking function to generate the index value;
   comparing the index value with index value entries in a lookup table, each index value entry corresponding to a session processor; and
   selecting a session processor for the packet, the session processor corresponding to the index value entry in the lookup table based on the comparison, the lookup table having a plurality of entries for particular ones of the session processors for load balancing among the plurality of session processors.

10. The method of claim 9 wherein the step of initializing comprises creating session processor entries in the lookup table for each of the plurality of session processors, the number of session processor entries within the table based upon at least one performance characteristic for each session processor within the plurality of session processors, and the step of creating further comprises deriving at least one performance characteristic for each session processor, the load balancing operable to include more lookup table entries for session processors having a greater processing capability.

11. The method of claim 1 wherein initializing the lookup table comprises populating the lookup table with session processor entries such that session processors having one or more powerful performance characteristics have more session processor entries in the lookup table than session processors having one or more less powerful performance characteristics.

12. A data communications device comprising:
   at least one communications interface having a flow distribution processor;
   at least two session processors coupled to the flow distribution processor;
   a memory coupled to the flow distribution processor; and
   an interconnection mechanism coupling the at least one communications interface, the memory, and the at least two session processors;
   wherein the flow distribution processor is configured to:
   receive a packet, the packet having a header component;
   generate an index value based upon at least a portion of the header component, the index value corresponding to a session processor for the packet;
   initialize a lookup table having index value entries and corresponding performance characteristic weighted session processor entries;
   create session processor entries in the lookup table for each of the plurality of session processors, the number of session processor entries within the table based upon at least one performance characteristic for each session processor within the plurality of session processors, the flow distribution processor further operable to perform load balancing by maintaining entries such that session processors having greater processing capabilities are more likely to process the received packet; and select the session processor to process the packet from the plurality of session processors based upon the index value in the lookup table.

13. The data communications device of claim 12 wherein the flow distribution processor, when receiving, is further configured to obtain at least a portion of the header component from the packet.

14. The data communications device of claim 13 wherein the flow distribution processor, when obtaining, is further configured to receive transport layer information from the header component.

15. The data communications device of claim 12 wherein the flow distribution processor, when generating, is configured to combine a portion of the header component with a masking function to generate the index value, the index value corresponding to a session processor for the packet, the flow distribution processor, when combining, being configured to combine transport layer information from the header component with a masking function to generate the index value, the index values based on load balanced session processor selection.

16. The data communications device of claim 12 wherein the flow distribution processor, when selecting, is configured to select a routing vector for the packet based upon the index value, the routing vector indicative of a network address and directing the packet to a corresponding session processor.

17. The data communications device of claim 12 wherein the flow distribution processor, when selecting, is configured to compare the index value with index value entries in a lookup table, each index value entry corresponding to a session processor and is configured to select a session processor corresponding to the index value entry in the lookup table based on the comparison.

18. The data communications device of claim 12 wherein the flow distribution processor is further configured to derive at least one performance characteristic for each session processor.

19. The data communications device of claim 12 wherein the flow distribution processor is further configured to repeat the steps of receiving, generating, and selecting for a plurality of packets to cause load balancing of the packets among the plurality of session processors.

20. The data communications device of claim 12 wherein one of the at least two session processors is integrally formed with the flow distributor processor.

21. The data communications device of claim 12 wherein the flow distribution processor comprises a lookup table having a plurality of index value entries and a plurality of session processor entries, each session processor entry corresponding to at least one index value entry.

22. A computer program product having a computer-readable medium including computer program logic stored thereon that, when performed on a computer, causes the computer to:

receive a packet, the packet having a header component;

generate an index value based upon at least a portion of the header component, the index value corresponding to a session processor for the packet;

initialize a lookup table having index value entries and corresponding session processor entries, wherein initializing comprises creating session processor entries in the lookup table for each of the plurality of session processors, the number of session processor entries within the table based upon at least one performance characteristic for each session processor within the plurality of session processors; and select the session processor to process the packet from the plurality of session processors based upon the index value in the lookup table.

23. A data communications device comprising:

at least one communications interface having a flow distribution processor;

at least two session processors coupled to the flow distribution processor;

a memory coupled to the flow distribution processor; and an interconnection mechanism coupling the at least one communications interface, the memory, and the at least two session processors;

wherein the flow distribution processor includes:

means for receiving a packet, the packet having a header component;

means for generating a performance weighted index value based upon at least a portion of the header component, the index value corresponding to a session processor for the packet means for initializing a lookup table having index value entries and corresponding performance characteristic weighted session processor entries;

means for creating session processor entries in the lookup table for each of the plurality of session processors, the number of session processor entries within the table based upon at least one performance characteristic for each session processor within the plurality of session processors, the flow distribution processor further operable to perform load balancing by maintaining entries such that session processors having greater processing capabilities are more likely to process the received packet; and means for selecting the session processor to process the packet from the plurality of session processors based upon the index value in the lookup table.

* * * * *